United States Patent
Cheng et al.

(10) Patent No.: US 9,720,141 B1
(45) Date of Patent: Aug. 1, 2017

(54) COVER ASSEMBLY FOR ELECTRONIC DEVICES

(71) Applicant: Amazon Technologies, Inc., Seattle, WA (US)

(72) Inventors: Shan Cheng, Los Altos, CA (US); Jianjun Yang, San Jose, CA (US); Minho Jung, Shenzhen (CN)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/611,974

(22) Filed: Feb. 2, 2015

Related U.S. Application Data (60) Provisional application No. 62/072,051, filed on Oct. 29, 2014, provisional application No. 62/090,824, filed on Dec. 11, 2014.

(51) Int. Cl.
*G02B 1/10* (2015.01)
*G02B 1/115* (2015.01)
*G02B 1/18* (2015.01)

(52) U.S. Cl.
CPC ............... *G02B 1/115* (2013.01); *G02B 1/18* (2015.01)

(58) Field of Classification Search
CPC .. G02B 1/115; G02B 1/18; G02B 1/11; G02B 5/18; G02B 5/0242; G02B 1/116; G02B 1/16; G02B 1/10; G02B 1/111; G02B 1/114; G06F 3/041; G06F 3/044; G06F 2203/04103; G06F 1/1658; C03C 17/3441; C03C 17/34; G02F 1/133308
USPC ........................................ 359/580, 586, 513
See application file for complete search history.

(56) References Cited

U.S. PATENT DOCUMENTS

| | | | |
|---|---|---|---|
| 2007/0292659 A1* | 12/2007 | Li | G06F 3/041 428/141 |
| 2015/0241606 A1* | 8/2015 | Kim | G02B 1/18 359/513 |

* cited by examiner

*Primary Examiner* — Euncha Cherry
(74) *Attorney, Agent, or Firm* — Lee & Hayes, PLLC (57) ABSTRACT

Describe herein are electronic devices that include a display stack having a cover component atop a display component. In some instances, the cover component includes an anti-reflective stack having multiple layers tuned to reduce the amount of natural light reflected at a user of the device. In some cases, an anti-fingerprint coating may be applied over the anti-reflective stack to provide an exterior surface to the display stack.

20 Claims, 8 Drawing Sheets

| Anti-Fingerprint | Result | 0 Cycles | 1,000 Cycles | 3,000 Cycles | 4,000 Cycles |
|---|---|---|---|---|---|
| Daikin UF 503 | Contact Angle | 119.2 | 118.05 | 114.45 | 110.45 |
| Daikin UF 503 | Visible Scratch | No | No | No | No |
| Daikin UF 503 | Contact Angle | 116.85 | 113.45 | 110 | 109 |
| Daikin UF 503 | Visible Scratch | No | No | No | No |
| Daikin UF 504 | Contact Angle | 118.35 | 115.35 | 113.8 | 111.25 |
| Daikin UF 504 | Visible Scratch | No | No | No | Yes |

COVER ASSEMBLY FOR ELECTRONIC DEVICES

RELATED APPLICATION

This application claims priority to U.S. Provisional Application No. 62/072,051 to Cheng, entitled "Cover Assembly for Electronic Devices," filed Oct. 29, 2014 and U.S. Provisional Application No. 62/090,824 to Cheng et al., entitled "Scratch Resistant Anti-Reflective Coating," filed Dec. 11, 2014, the contents of which are incorporated herein by reference in their entirety.

BACKGROUND

A large and growing population of users is enjoying entertainment through the consumption of digital content, such as music, movies, images, electronic books, and so on. The users employ various devices with electronic displays such as electronic book ("eBook") readers, cellular telephones, smart phones, portable media players, tablet computers, wearable computers, laptop computers, netbooks, desktop computers, televisions, appliances, home electronics, automotive electronics, augmented reality devices, and so forth to view the digital content. Electronic displays may present various types of information, such as user interfaces, device operational status, digital content items, and the like, depending on the kind and purpose of the associated device. The appearance and quality of a display can affect the user's experience with the electronic device and the content presented thereon.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes, in part, electronic devices that include electronic displays for displaying digital content to one or more users. In some particular examples, this disclosure describes display stacks and cover components configured to provide a clearer, sharper image to the user. In general, a display stack has a number of layers, including a number of substrates and one or more adhesive layers to bond the substrates. For example, a display stack may include a display component that displays content. Additionally, a number of additional substrates may be stacked on top of the display component. To illustrate, a display stack may include a touch layer that generates signals in response to an input device contacting the display stack. In some cases, a substrate of the display stack may include a cover component located at the top of the display stack to protect other substrates of the display stack. The display stack may also include a lighting component, such as a front-side lighting component or a backlight lighting component to provide light to view the content displayed by the display component.

In particular, the disclosure describes a cover component configured to improve the visibility of images displayed on a device when used outdoors. For instance, when an emissive display is viewed outdoors, natural light reflecting off the coverglass or cover element may interfere with the light generated by the display stack or the light used to present the image display. For example, the cover component may include an anti-reflective coating over the cover element to reduce the amount of natural light being reflected off of the cover element, in some cases, back at the user. For instance, the anti-reflective coating may be formed from one or more materials selected to cause a phase shift in some of the natural light by up to 180 degrees as the natural light contacts the anti-reflective coating thereby canceling or disrupting at least some of the reflected light. In this manner, the amount of natural light interfering or competing with the light generated by the display stack is reduce resulting in a brighter clearer image when the device is used outdoors.

In some cases, the anti-reflective coating may be an anti-reflective stack or include multiple anti-reflective layers having different refractive indexes. For instance, the anti-reflective stack may include a layer of low refractive index material disposed over a layer of high refractive index material. In some cases, the low refractive index material may be selected based in part on the refractive index of air (e.g., a refractive index of one). For example, the refractive index may be about 1.2 or 1.3. In other cases, the low refractive index material may be a material having a refractive index less than 1.6, while in still other cases, the low refractive index material may be a material having a refractive index of less than 1.55. For example, by approximating the refractive index of the top layer of the anti-reflective stack to the refractive index of air the overall quality of the display may be improved. In some implementations, the high refractive index material may be about 2.4 to 2.6. In other cases, the high refractive index material may be a material having a refractive index greater than 1.6, while in still other cases, the low refractive index material may be a material having a refractive index of greater than 2.3.

In some implementations, multiple alternating layers of material may form the anti-reflective stack. The alternating layers may be applied to reduce the amount of natural light being reflected off the display stack for specific or targeted wavelengths. In one example, the visible spectrum may be divided into 100 nanometer (nm) segments, such as 400 nm to 500 nm, 501 nm to 600 nm, 601 nm to 700 nm, and 701 nm to 800 nm and each of the 100 nm segments may correspond to a low refractive index layer and a high refractive index layer to reduce or cancel some of the natural light being reflected off the display. In some cases, each segment may cancel or reduce more of the natural light being reflected within the targeted wavelengths than the natural light corresponding to other wavelengths. Thus, in the present example, the combination of the eight individual layers of the anti-reflective stack may together cancel or reduce the natural light reflected within the visible spectrum and, thereby improve the visibility of the image presented on the display. In another example, the visible spectrum may be divided into segments as small as 1 nm. Thus, in this example, the anti-reflective stack may include approximately 400 segments (e.g., approximately 1 segment for each wavelength between 380 nm and 780 nm). However, in some examples, the anti-reflective stack may have as few as 2 layers. In one specific implementation, the anti-reflective stack may have 100 layers. In another specific implementation, the anti-reflective stack may have between 4 and 12 layers.

In some cases, the thickness of each anti-reflective layer may be varied or set based in part on the desired or targeted wavelength. In other cases, a thickness of the high refractive index material may be the same for each segment and a thickness of the low refractive index material may be the same for each segment. Similarly, the material selected for each layer may also be different based on the desired or targeted wavelength. In other examples, the high refractive index material may be the same for each segment and the low refractive index material may be the same for each segment.

In other cases, an additional anti-reflective layer may be applied as the bottom layer of the anti-reflective stack. For example, as discussed above, the top layer may be low refractive index material to approximate the refractive index of air. The anti-reflective layers may then alternate between high refractive index material and the low refractive index material. However, in some situations, the quality of the display may be improved by having a low refractive index material as the bottom layer to approximate the refractive index of material forming the cover element (such as glass) and, thereby reduce distortion caused by the transition of the light into the cover element. In these cases, it should be understood that, the anti-reflective stack may include an odd number of layers, such as 7, 9, or 11.

In some implementations, an anti-fingerprint coating may be applied over the anti-reflective stack. For instance, in some cases, the materials selected for the anti-reflective layers may be easily scratched, smudged, or otherwise damaged when touched. Therefore, in some situations, an anti-fingerprint coating or layer may be applied to the top surface of the display stack or cover component to protect the anti-reflective layers from scratching, chipping, or peeling. For instance, a material for the anti-fingerprint coating may be selected to ensure greater than 3,000 cycles on a steel wool abrasion test described in more detail below with respect to FIG. 7. In one particular example, each cycle of the steel wool test may include a back and forth pass of the steel wool pad having a size about 4.0 and weight of one kilogram at a rate of about 60 cycles per minute. In some cases, the steel wool pad may be replaced every 1,000 cycles. In other instances, the material for the anti-fingerprint coating may be selected to ensure greater than 4,000 or as high 5,000 cycles on a steel wool abrasion test.

In other implementations, the cover component may also be configured to reduce the amount of light reflected back at a user within the non-visible spectrums. For instance, in some cases, displays of electronic devices may act as a mirror and cause at least a portion of the light (both visible and non-visible spectrums) to reflect directly at a user which may in turn damage the user's skin. Thus in some cases, the anti-reflective stack may include additional layers to reduce the reflected light in the non-visible spectrum as well as the visible spectrum even though light within the non-visible spectrums may not interfere with the quality of the display or the visibility of an image presented on the display. In some examples, by adding alternating layers of high refractive index anti-reflective material and low refractive index anti-reflective material over the cover glass, a display stack may be generated with a transmittance rating of greater than 95 percent, a reflectance of less than five percent, and a haze of less than 0.5 percent.

In an illustrative implementation, the display stack may be formed by combining a number of substrates and/or components one atop the other. For instance, FIGS. 1-4, described below, illustrate example schematic cross-section of a display stack including a number of layers taken along line A-A of FIG. 5.

Figure 1:
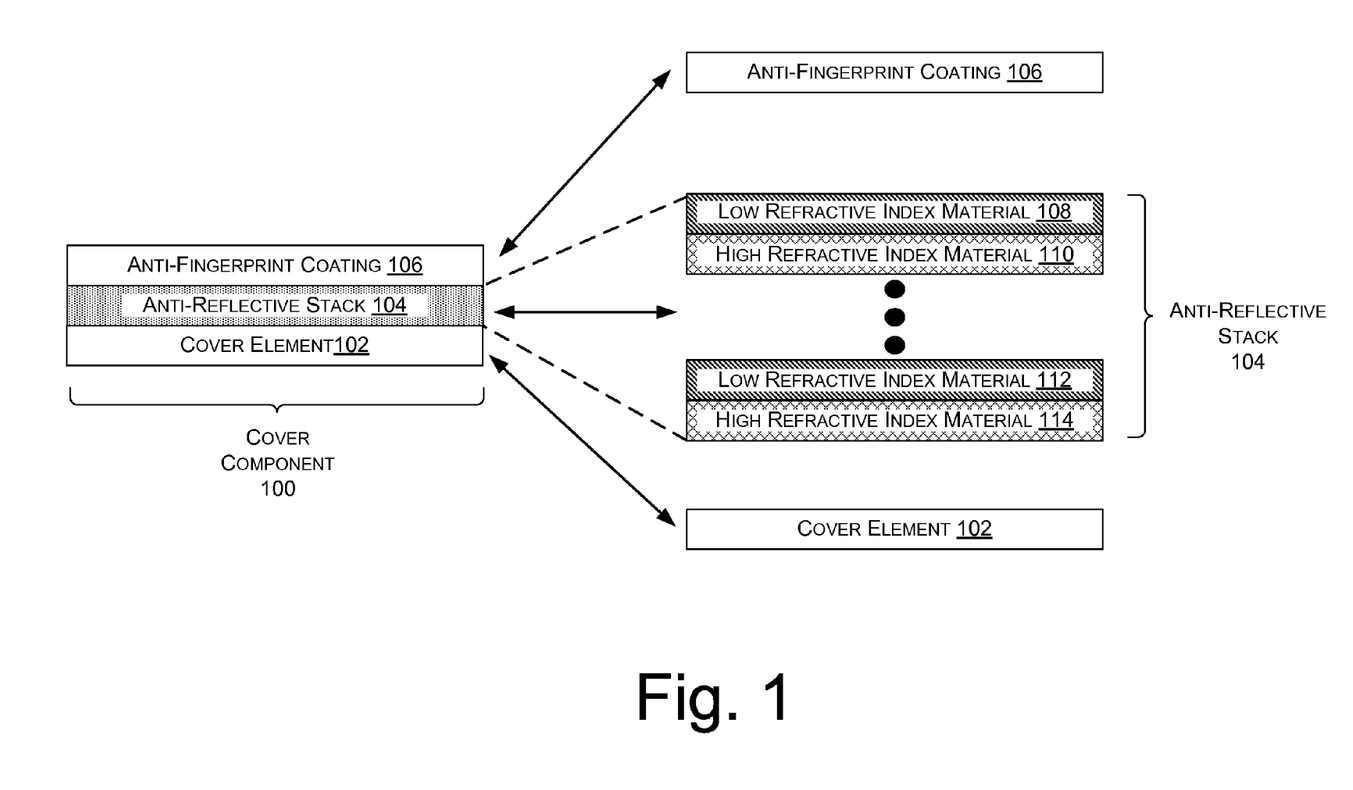
FIG. 1 illustrates an example schematic cross-section of a cover component of a display stack of an electronic device.

FIG. 1 illustrates an example schematic cross-section of a cover component 100 of a display stack of an electronic device. In general, the cover component 100 may include various layers, which may be formed from different materials and/or include multiple layers. For instance, the cover component 100 includes a cover element 102, an anti-reflective stack 104, and an anti-fingerprint coating 106. Thus, the cover component 100 may be configured to reduce the amount of light reflected back at the user to improve the quality or visibility by increasing the brightness of the image presented on the display, particularly when the electronic device is used outdoors.

In some cases, the cover element 102 may be configured to run the entire width and height of the electronic device and may be formed from a transparent inorganic material, such as a glass, sapphire, ceramic aluminum or combinations thereof. In other cases, the cover element 102 may be formed form a transparent organic material, such as a plastic or polymer material. In some instances, the cover element 102 may run the entire width and height of the electronic device and be formed from a material selected to provide sufficient rigidity and hardness to the overall electronic device.

The anti-reflective stack 104 includes multiple layers. For instance, the anti-reflective stack 104 includes alternating layers of low refractive index material and high refractive index material. In the illustrated example, the anti-reflective stack 104 includes layers of low refractive index material 108 and 112 and layers of high refractive index material 110 and 114. However, it should be understood, that any number of layers may be associated with the anti-reflective stack 104. For example, the number of layers may be based at least in part on the selected granularity or size of the segments of the light spectrum. In another example, the anti-reflective stack 104 may include both a low refractive index material and a high refractive index material for each segment in order to cause phase shifts in the light of wavelengths associated with each segment to thereby introduce destructive interference to cancel, disturb, or reduce the light within the wavelengths that would be otherwise reflected at the user. Thus, for the visible spectrum as many as 400 segments or 800 layers (e.g., a low refractive index material layer and a high refractive index material layer for each nm wavelength). Alternately, for at least a portion of the visible spectrum, the anti-reflective stack 104 may have as few as two layers (e.g., one low refractive index material layer and one high refractive index material layer for the entire visible spectrum).

In some cases, the thickness of each of the layers 108-114 may in part determine the target wavelengths and the granularity or size of each of the wavelength segments. For example, by adjusting the thickness of each layer 108-114 it is possible to tune the layer to phase shift targeted wavelengths to a greater degree than light at other wavelengths. In this manner, the true color of the light output by the display stack may be better maintained. In some examples, each of the layers may be less than 40 nm thick and the anti-reflective stack may be less than 400 nm thick. In other examples, the anti-reflective stack may be less than 800 nm. In still other examples, the thickness of the anti-reflective stack may vary based on the number of anti-reflective layers. For instance, as the number of layers of the anti-reflective stack increases, the total thickness of the anti-reflective stack may also increase.

In general, the low refractive index materials may be selected based on the refractive index of air or a refractive index of one. In other cases, the low refractive index material may have a refractive index less than 1.55. For example, the low refractive index material may be selected based on a closeness of the refractive index of the material to a refractive index of one. In some cases, the high refractive index materials may be selected based on a desired refractive index of 1.6 or greater. In other cases, the high refractive index materials may be selected based on a desired refractive index of 2.3 or greater. Thus, in some examples, each of the low refractive index material layers 108 and 112 may be formed from silicon dioxide and each of the high refractive index material layers 110 and 114 may be formed from at least one of titanium dioxide, aluminum oxide nitride, or silicon nitride.

The anti-fingerprint coating 106 may be applied over the anti-reflective stack 104 and act as the top surface of the cover component 100. Thus, the anti-fingerprint coating 106 may be the top layer or the layer of the display stack exposed to the user. For instance, in some cases, the materials selected for the anti-reflective stack 104 may be easily scratched, smudged, or otherwise damaged when touched. For instance, some examples of the material selected for the anti-fingerprint coating 106 may include Daikin UF 503, Daikin UF 504, Daikin UD 30x series, UD40x series, and UD50x series, Daikin-OPTOOL DXS, Canon Surfclear 100, or SHINESTUS. In some situations, the anti-fingerprint coating 106 may be applied over the anti-reflective stack 104 to protect the anti-reflective stack 104 from scratching, chipping, or peeling. For instance, a material for the anti-fingerprint coating 106 may be selected to provide a hardness rating of between 5H pencil and 9H pencil. In other instances, the material for the anti-fingerprint coating may be selected to ensure greater than 5,000 cycles on a steel wool abrasion test. In some cases, a material of the anti-fingerprint coating 106 may be a fluoro containing material, such as a fluoro-polymer.

FIG. 1 illustrates an example schematic cross-section of the cover component 100 having an even number of anti-reflective layers. However, in other examples, such as the example illustrated below in FIG. 2, the cover component 100 may include an anti-reflective stack having an odd number of layers.

Figure 2:
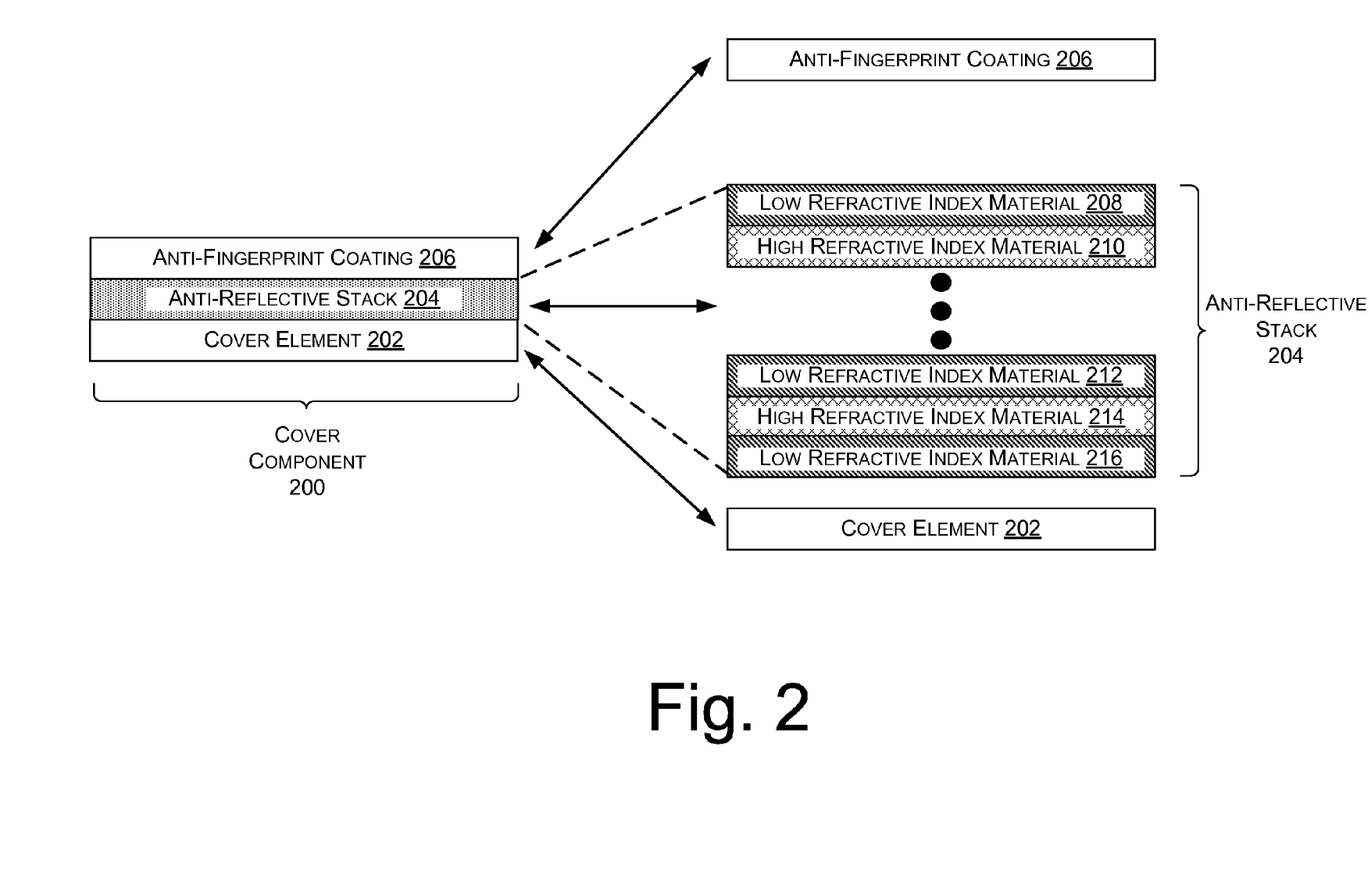
FIG. 2 illustrates another example schematic cross-section of a cover component of a display stack of an electronic device.

FIG. 2 illustrates another example schematic cross-section of a cover component 200 of a display stack of an electronic device. As discussed above, the cover component 200 may include various layers, which may be formed from different materials and/or include multiple layers. For instance, the cover component 200 includes a cover element 202, an anti-reflective stack 204, and an anti-fingerprint coating 206. Thus, the cover component 200 may be configured to reduce the amount of light reflected back at the user to improve the quality or visibility of the image presented on the display, particularly when the electronic device is used outdoors.

In some cases, the cover element 202 may be configured to run the entire width and height of the electronic device and may be formed from a transparent inorganic material, such as glass, sapphire, ceramic aluminum or combination thereof. For instance, the cover element 202 may run the entire width and height of the electronic device and be formed from a material selected to provide sufficient rigidity and hardness to the overall electronic device.

The anti-reflective stack 204 includes multiple layers. For instance, the anti-reflective stack 204 includes alternating layers of low refractive index material and high refractive index material. In the illustrated example, the anti-reflective stack 204 includes layers of low refractive index material 208, 212, and 216, as well as layers of high refractive index material 210 and 214. However, as discussed above, it should be understood, that any number of layers may be associated with the anti-reflective stack 204. For example, the number of layers may be based at least in part on the selected granularity or size of the segments of the light spectrum to be shifted. For example, the anti-reflective stack 204 may include both a low refractive index material and a high refractive index material for each segment in order to cause phase shifts in the light associated with each segment to thereby introduce destructive interference within the wavelengths associated with the segment to cancel, disturb, or scatter the light that would be otherwise reflected.

In the illustrated example, in addition to the pairs of low refractive index material and high refractive index materials, an additional low refractive index material 216 may be included as the bottom layer of the anti-reflective stack 204. For example, the low refractive index material 216 may be included to bridge or reduce the amount of destructive interface caused by the transition between the high refractive index material 214 and the cover element 202. Further, the addition of the low refractive index material 216 may also act to form a foundation or better bond between the anti-reflective stack 204 and the cover element 202.

As discussed above, the anti-fingerprint coating 206 may be applied over the anti-reflective stack 204 and act as the top surface of the cover component 200. In some examples, the anti-fingerprint coating 206 may be applied by a deposition process, such as sputtering deposition, electron-beam assisted deposition, electro beam deposition, plasma-enhanced chemical vapor deposition, or atomic layer deposition. Thus, the anti-fingerprint coating 206 may be the top layer or the layer of the display stack exposed to the user. For instance, in some cases, the materials selected for the anti-reflective stack 204 may be easily scratched, smudged, or otherwise damaged when touched. Therefore, in some situations, the anti-fingerprint coating 206 may be applied over the anti-reflective stack 204 to protect the anti-reflective stack 204 from scratching, chipping, or peeling. For instance, a material for the anti-fingerprint coating may be selected to ensure greater than 3,000 cycles on a steel wool abrasion test described in more detail below with respect to FIG. 7. In one particular example, each cycle of the steel wool test may include a back and forth pass of the steel wool pad having a size about 4.0 and weight of one kilogram at a rate of about 60 cycles per minute. In some cases, the steel wool pad may be replaced every 1,000 cycles. In other instances, the material for the anti-fingerprint stack may be selected to ensure greater than 4,000 or as high 5,000 cycles on a steel wool abrasion test.

In the current example, a low refractive index material is shown as the top and bottom layers of the anti-reflective stack 204. However, it should be understood in other examples, the high refractive index material may be used to form the top and bottom layers of the anti-reflective stack 204, for instance, when a material other than glass is utilized to form the cover element 202.

FIGS. 1 and 2 illustrate a cover component in which the anti-reflective stack is applied to a top surface of the cover element for use in, for example, fully laminated display stacks. However, in some cases, the display stack may be arranged with an air gap or space between the cover component and the other components. In these cases, an anti-reflective stack may be applied to the underside of the cover element in lieu of or in addition to the anti-reflective stack on the top surface of the cover element illustrated in FIGS. 1 and 2.

Figure 3:
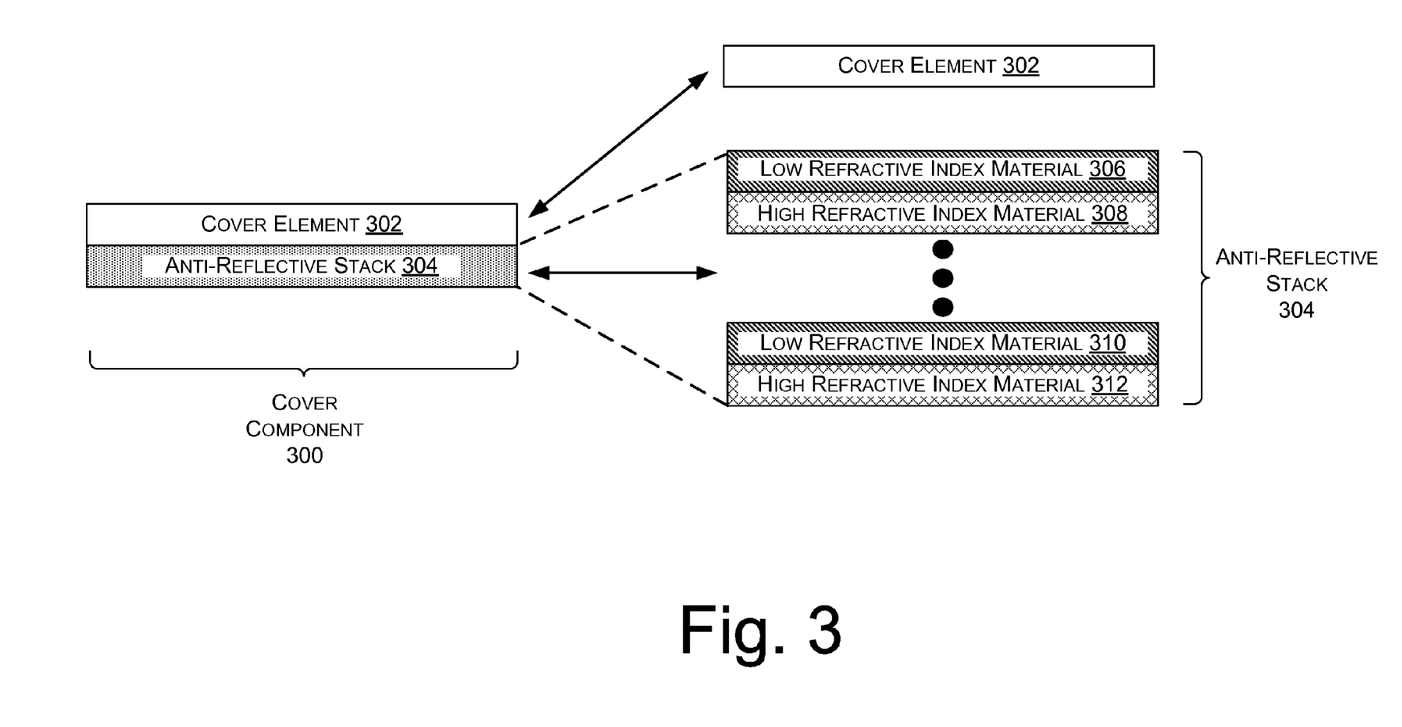
FIG. 3 illustrates another example schematic cross-section of a cover component of a display stack of an electronic device.

FIG. 3 illustrates another example schematic cross-section of a cover component 300 of a display stack of an electronic device. In the illustrated example, the cover element 302 is located over the anti-reflective stack 304. For example, in some cases, an air gap or space exists between the cover component 300 and the remainder of the display stack. In these cases, the anti-reflective stack 304 may be located below the cover element 302 and, thereby protected from scratching, chipping, and peeling without use of the anti-fingerprint coating of FIGS. 1 and 2.

As described above, the cover element 302 may be configured to run the entire width and height of the electronic device and may be formed from a transparent inorganic material, such as glass, sapphire, ceramic aluminum or combination thereof. For instance, the cover element 302 may run the entire width and height of the electronic device and be formed from a material selected to provide sufficient rigidity and hardness to the overall electronic device.

The anti-reflective stack 304 includes multiple layers. For instance, the anti-reflective stack 304 includes alternating layers of low refractive index material and high refractive index material. In the illustrated example, the anti-reflective stack 304 includes layers of low refractive index material 306 and 310 and layers of high refractive index material 308 and 312. However, it should be understood, that any number of layers may be associated with the anti-reflective stack 304. For example, the number of layers may be based at least in part on the selected granularity or size of the segments of the light spectrum.

For example, the anti-reflective stack 304 may include both a low refractive index material and a high refractive index material for each segment in order to cause phase shifts in the light associated with each segment to thereby introduce destructive interference within the wavelengths associated with the segment to cancel, disturb, or scatter the light that would be otherwise reflected at the user. Thus, for the visible spectrum as many as 400 segments or 800 layers (e.g., a low refractive index material layer and a high refractive index material layer for each nm wavelength) may be utilized in the cover component. Alternately, for the visible spectrum, the anti-reflective stack 304 may have as few as two layers (e.g., one low refractive index material layer and one high refractive index material layer for the entire visible spectrum).

In another instances, the anti-reflective stack 304 may include additional layers associated with segments of the light spectrum outside of the visible spectrum. While the light reflected off the display outside of the visible spectrum does not necessarily interfere with the image presented on the display, the light may be reflected directly at the user of the device. For instance, in some cases, such as ultra-violate (UV) light, the reflected light may be damaging to the user's skin or eyes and, in other cases, such as infrared (IR) light, may be reflected exposing the user to heat which may cause discomfort. Therefore, in some cases, the anti-reflective stack may include one or more layers turned to introduce disruptive interference and/or phase shifts in the light within the UV or IR spectrum to cancel or prevent the UV or IR light from being reflected back at the user.

In some cases, the thickness of each of the layers 306-312 may in part determine the target wavelengths and the granularity or size of each of the segments. For example, by adjusting the thickness of each layer 306-312 it is possible to tune the layer to phase shift selected wavelengths by predetermined number of degrees, while allowing other wavelengths to pass. In this manner, the true color of each wavelength output by the display stack may be maintained while still reducing the amount of natural light being reflected.

In general, the low refractive index materials may be selected based on the refractive index of air or a refractive index of one. For example, the low refractive index material may be a material selected to have a refractive index of less than 1.55. In some cases, the high refractive index materials may be selected based on a desired refractive index of 1.6 or greater. In other cases, the high refractive index materials may be selected based on a desired refractive index of 2.3 or greater. In some examples, each of the low refractive index material layers 306 and 310 may be formed from silicon dioxide and each of the high refractive index material layers 308 and 312 may be formed from at least one of titanium dioxide, aluminum oxide nitride, or silicon nitride.

Figure 4:
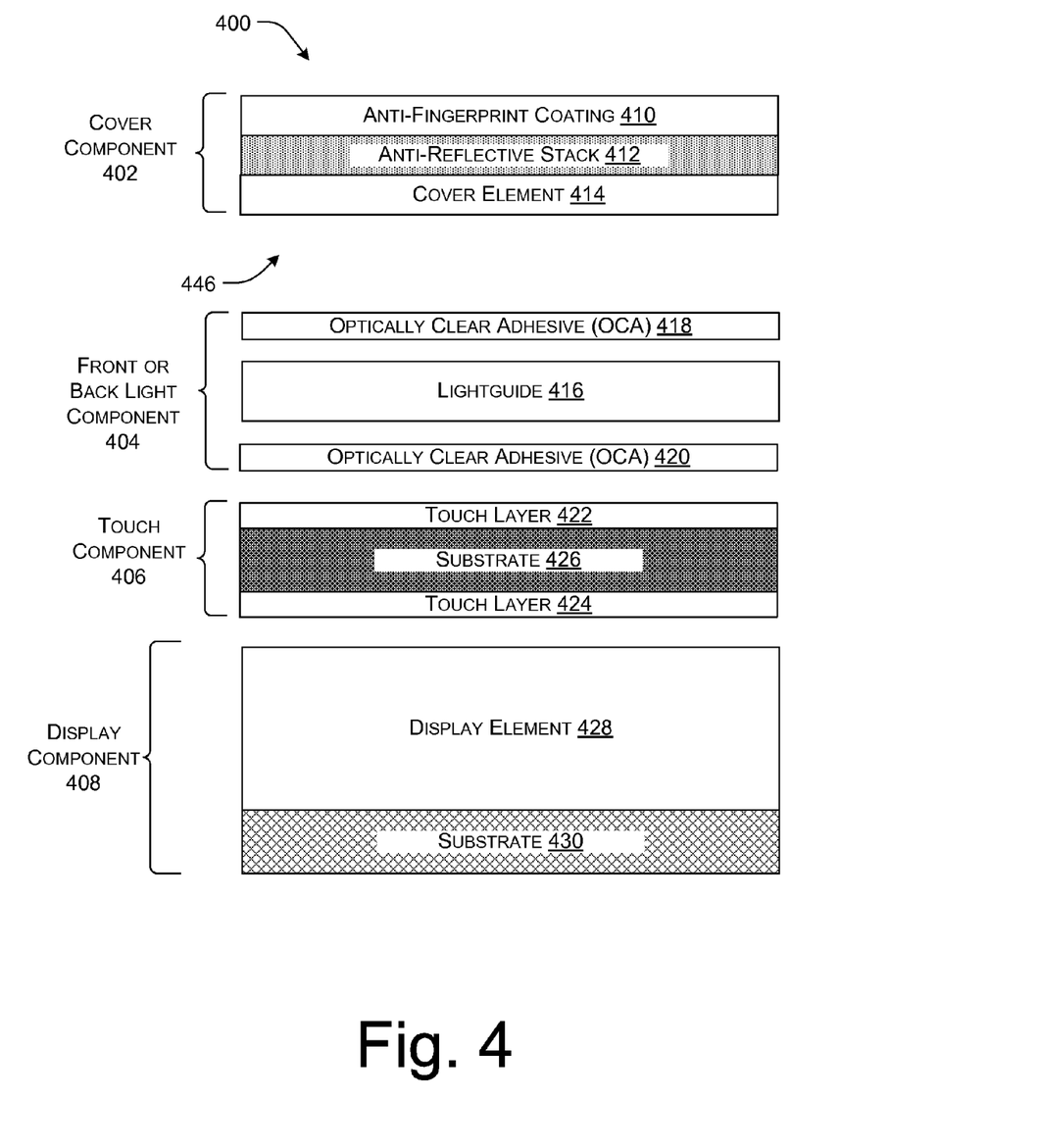
FIG. 4 illustrates an example schematic cross-section of a display stack of an electronic device.

FIG. 4 illustrates an example schematic cross-section of a display stack 400 of an electronic device. In general, the display stack 400 includes a cover component 402, a front or back light component 404, a touch layer 406, and a display component 408. As described above, the cover component 402 is formed from various layers, such as an anti-fingerprint coating 410 disposed atop an anti-reflective stack 412, that is disposed atop a cover element 414.

In some implementations, the anti-fingerprint coating 410 may be applied over the anti-reflective stack 412 to act as the top surface of the cover component 402 exposed to a user. For instance, a material for the anti-fingerprint coating may be selected to ensure greater than 3,000 cycles on a steel wool abrasion test described in more detail below with respect to FIG. 7. In one particular example, each cycle of the steel wool test may include a back and forth pass of the steel wool pad having a size about 4.0 and weight of one kilogram at a rate of about 60 cycles per minute. In some cases, the steel wool pad may be replaced every 1,000 cycles. In other instances, the material for the anti-fingerprint coating may be selected to ensure greater than 4,000 or as high 5,000 cycles on a steel wool abrasion test.

The anti-reflective stack 412 may include multiple layers, as described above. For instance, the anti-reflective stack 412 may include alternating layers of low refractive index material and high refractive index material tuned to prevent light of particular wavelengths from reflecting off the display. For example, the number of layers may be based at least in part on the selected granularity or size of the segments of the light spectrum.

In the illustrated example, the front or back light component 404 generally includes a lightguide 416 connected to a light source (not shown). The lightguide 416 as illustrated is surrounded on the top and bottom by a layer of optically clear adhesive 418 and 420. The lightguide 416 may include a substrate (not shown) formed from a transparent thermoplastic, a layer of lacquer and multiple grating elements that function to propagate light from the light source towards the top surface of the display stack 400, thus illuminating the content presented on the display.

In some implementations, the light source may be connected to a flexible printed circuit (FPC) to control the quality and volume of light generated. In some instances, the light source (e.g., one or more LEDs) may connect to the FPC via one of the optically clear adhesive layers 418 or 420. For example, the FPC may be connected to the light source via a solid strip of solid optical clear adhesive or the like. The FPC may also be connected to the lightguide 416 via the optically clear adhesive. In some instances, the FPC may include a light-diffusing refractive coating (e.g., in the form of a white matte finish), which may help to diffuse and reflect light from the light source and, hence, increase the uniformity of the light across the front of the display.

In some cases, a touch sensor or touch component 406 includes one or more touch layers 422 and 424 (e.g., rows and/or columns that form a grid or diamond shape) applied to one or more surfaces of a substrate 426 coupled to a touch controller (not shown). For instance, in the illustrated example, the touch layer 422 (e.g., the rows) is applied to the top surface of the substrate 426 and the touch layer 424 (e.g., the columns) is applied to the bottom surface of the substrate 426 or vice versa. In some particular implementations, the touch component 406 may include a single layer multi-touch pattern (e.g., both the rows and columns) applied to a single side of the substrate 426.

In the illustrated example, the touch component 406 resides atop the display component 408. The display component 408 includes a display element 428 arranged atop a substrate 430. For example, the display element 428 and a corresponding display controller (not shown) may cause the display stack to present content to user via one or more image producing technologies. In various examples, the display element 428 may include an active display such as a liquid crystal display (LCD), a plasma display, a light emitting diode (LED) display, an organic light emitting diode (OLED) display, and so forth. In some examples, the display element 428 may include bi-stable LCDs, micro electromechanical system (MEMS) displays, such as interferometric modulator displays, cholesteric displays, electrophoretic displays, electrofluidic pixel displays, electrowetting displays, photonic ink displays, gyricon displays, and the like. In still other examples, the display element 428 may include a reflective display, such as an electronic paper display, a reflective liquid crystal display, or the like. For example, the display element 428 may include bi-stable LCDs, micro electromechanical system (MEMS) displays, such as interferometric modulator displays, cholesteric displays, electrophoretic displays, electrofluidic pixel displays, electrowetting displays, photonic ink displays, gyricon displays, among others. Electronic paper displays represent an array of display technologies that can mimic the look of ordinary ink on paper. In contrast to backlit displays, electronic paper displays typically reflect light, much as ordinary paper does. Accordingly, implementations herein are not limited to any particular display technology.

Figure 5:
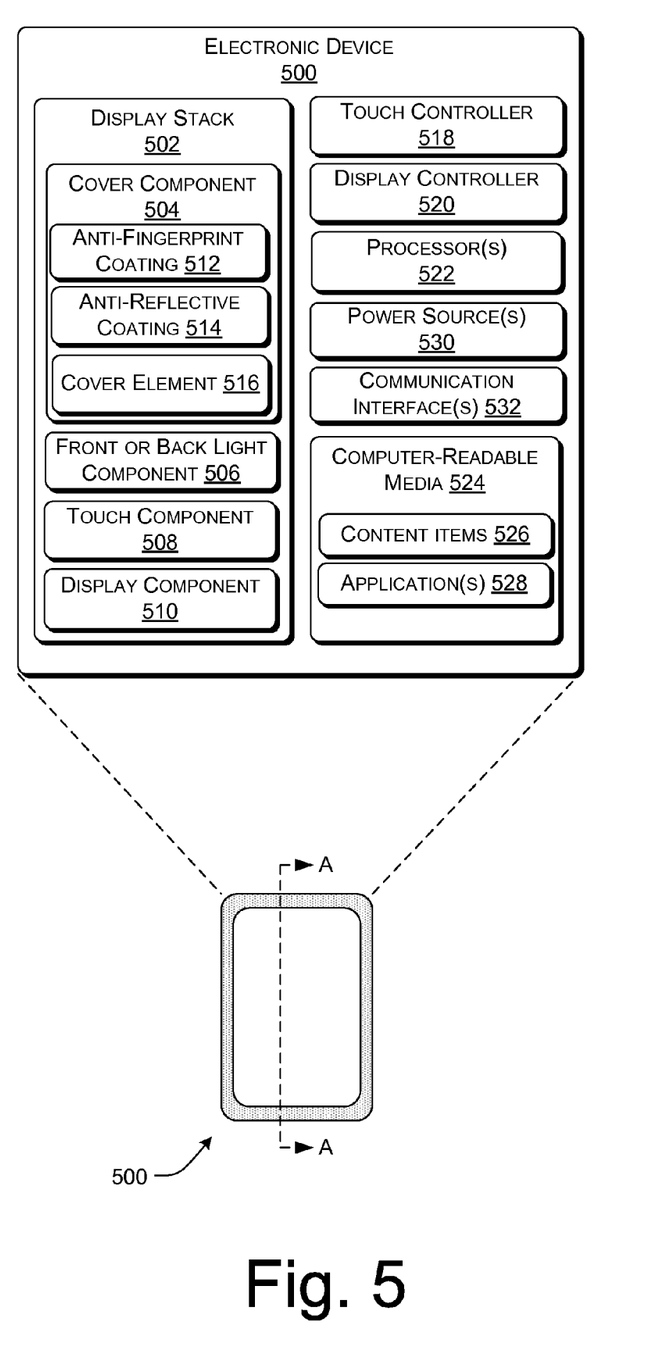
FIG. 5 illustrates an example electronic device including a display stack with the cover component of FIGS. 1-3.

FIG. 5 illustrates an example electronic device 500 including a display stack 502 that has a cover component 504. The cover component 504 may include implementations of the cover components described with respect to FIGS. 1-3. The electronic device 500 may comprise any type of mobile electronic device (e.g., an electronic book reader, a tablet computing device, a laptop computer, a multifunction communication device, a portable digital assistant (PDA), etc.) or non-mobile electronic device (e.g., a desktop computer, a television, etc.). In addition, while FIG. 5 illustrates several example components of the electronic device 500, it should be appreciated that the electronic device 500 may also include other conventional components, such as an operating system, system busses, input/output components, and the like.

The display stack 502 includes the cover component 504, a front or back light component 506, a touch component 508 and a display component 510. In one implementation, the cover component 504 includes at least an anti-fingerprint coating 512, an anti-reflective stack 514, and a cover element 516. In general, the cover component 504 may be formed with the anti-fingerprint coating 512 and the anti-reflective stack 514 in order to prevent natural light from reflecting off the display stack 502. For instance, by preventing natural light within the visible spectrum from being reflected back at the user, the cover component 504 may improve the visibility of the display component 510 (whether an emissive display or reflective display) and thereby produce a sharper, clearer image.

In some cases, the cover component 504 may be configured to protect the display from damage, such as scratching, chipping, peeling, as well as to provide rigidity and stiffness to the overall electronic device 500. For example, the cover component 504 includes the anti-fingerprint coating 512 which may include a material (such as a fluoro containing material) having a predetermined hardness or abrasion resistance.

The electronic device 500 may also include a front or back light component 506 for lighting the display stack 502. The front or back light component 506 may include a light guide and a light source. The light guide portion can include a substrate including a transparent thermoplastic polymer. For example, the light guide portion may include an acrylic polymer. In one implementation, the light guide portion can include PMMA. In a particular implementation, the light guide portion can include a substrate, a layer of lacquer and multiple grating elements formed in the layer of lacquer. The multiple grating elements may be configured to propagate light to illuminate the display component 510.

Furthermore, the amount of light emitted by the front light component 506 may vary. For instance, upon a user opening a cover of the electronic device 500, the light from the front light or back component 506 may gradually increase to its full illumination. In some instances, the electronic device 500 includes an ambient light sensor and the amount of illumination of the front or back light component 506 may be based at least in part on the amount of ambient light detected by the ambient light sensor. For example, the front or back light component 506 may be dimmer if the ambient light sensor detects relatively little ambient light, such as in a dark room; can be brighter if the ambient light sensor detects ambient light within a particular range; and may be dimmer or turned off if the ambient light sensor detects a relatively large amount of ambient light, such as direct sunlight.

The device 500 may also include a touch component 508 and a touch controller 518. In some instances, at least one touch component 508 resides atop the display component 510 to form a touch-sensitive display (e.g., an electronic paper touch-sensitive display) that is capable of both accepting user input and displaying content corresponding to the input. The touch component 508 may comprise a capacitive touch sensor, a force sensitive resistance (FSR), an interpolating force sensitive resistance (IFSR) sensor, or any other type of touch sensor. In some instances, the touch component 508 is capable of detecting touches as well as determining an amount of pressure or force of these touches.

The display stack 502 also includes a display component 510 and a corresponding display controller 520. For instance, the display stack 502 may include a display component 510 that may present content via one or more image producing technologies. In various examples, the display component 510 may include a reflective display, such as an electronic paper display, a reflective LCD, or the like. Electronic paper displays represent an array of display technologies that can mimic the look of ordinary ink on paper. In contrast to backlit displays, electronic paper displays typically reflect light, much as ordinary paper does. In addition, electronic paper displays can be bi-stable, meaning that these displays are capable of holding text or other displayed images even when very little or no power is supplied to the display. Some examples of the display component 510 that can be used with the implementations described herein include bi-stable LCDs, MEMS displays, such as interferometric modulator displays, cholesteric displays, electrophoretic displays, electrofluidic pixel displays, electrowetting displays, photonic ink displays, gyricon displays, and the like. In other implementations, or for other types of electronic devices 500, the display component 510 may include an active display such as a LCD, a plasma display, a LED display, an OLED display, and so forth. Accordingly, implementations herein are not limited to any particular display technology.

The electronic device 500 also includes one or more processors 522 and computer-readable media 524. Depending on the configuration of the electronic device 500, the computer-readable media 524 may be an example of tangible non-transitory computer storage media and may include volatile and nonvolatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 522.

The computer-readable media 524 may be used to store any number of functional components that are executable on the processors 522, as well as content items 526 and applications 528. Thus, the computer-readable media 524 may include an operating system and a storage database to store one or more content items, such as eBooks, audio books, songs, videos, still images, and the like. The computer-readable media 524 of the electronic device 500 may also store one or more content presentation applications to display content on the device 500. The content presentation applications may be implemented as various applications 528 depending upon the content items 526. For instance, one of the applications 528 may be an electronic book reader application for rendering textual electronic books, an audio player for playing audio books or songs, a video player for playing video, and so forth.

The electronic device 500 may also include one or more power sources 530 for providing power to the display stack 502 and one or more communication interfaces 532 to facilitate communication between one or more networks (such as the Internet or one or more local area networks) and/or directly with one or more devices. The communication interfaces 532 may also facilitate communication between one or more wireless access points, a master device, and/or one or more other computing devices as part of an ad-hoc or home network system. The communication interfaces 532 may support both wired and wireless connection to various networks, such as cellular networks, radio, WiFi networks, short-range or near-field networks (e.g., Bluetooth®), infrared signals, local area networks, wide area networks, the Internet, and so forth.

Figure 6:
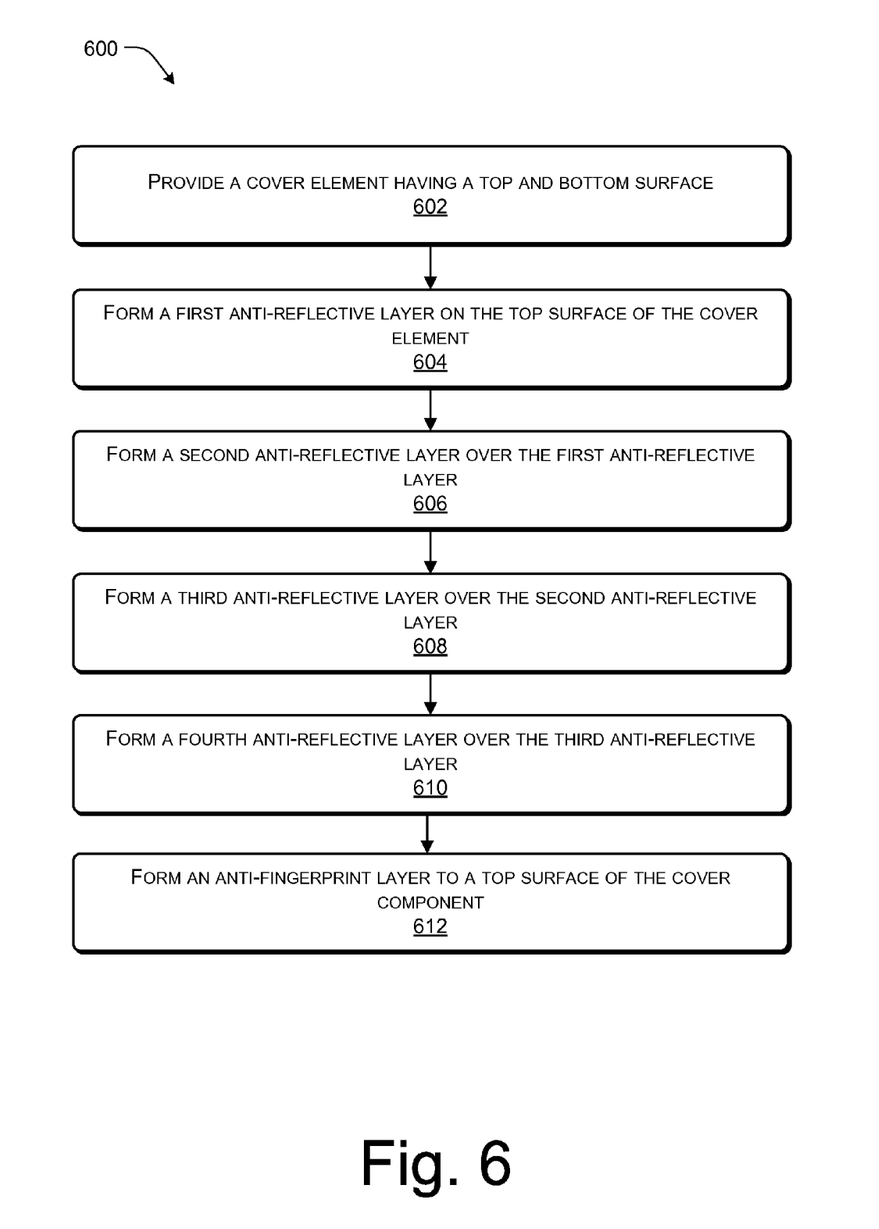
FIG. 6 illustrates an example flow diagram showing an illustrative process for forming the cover component of the display stack of FIGS. 1-3.

FIG. 6 is a flow diagram illustrating example processes for generating a cover component as described above. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 6 illustrates an example flow diagram showing an illustrative process 600 for forming the cover component of the display stack of FIGS. 1-4. For example, the cover component may be formed by various processes such as by deposition, lamination, and/or adhesion. FIG. 6 below provides one example in which the cover components of FIGS. 1-4 may be formed.

At 602, a cover element having a top and bottom surface is provided as a base for the cover component. For example, the cover element may be formed from a transparent inorganic material, such as a glass, sapphire, ceramic aluminum or combinations thereof. In other cases, the cover element may be formed form a transparent organic material, such as a plastic or polymer material. In some instances, the cover element may run the entire width and height of the electronic device and be formed from a material selected to provide sufficient rigidity and hardness to the overall electronic device.

At 604, a first anti-reflective layer is formed on the top surface of the cover element. The first anti-reflective layer may have a refractive index of greater than 1.6. For example, the first anti-reflective layer may include one or more of Aluminum Oxynitride ($AlO_xN_y$), Titanium Dioxide ($TiO_2$), Silicon Nitride ($Si_3N_4$), or Lanthanum Titanium Oxide ($La_2Ti_2O_7$). In some cases, the thickness of a first anti-reflective layer be adjusted to target a particular wavelength.

At 606, a second anti-reflective layer is formed on the top surface of the first anti-reflective layer. In some embodiments, the refractive index of the second anti-reflective layer may be lower that the refractive index of the first anti-reflective layer. For example, in a particular embodiment, the second anti-reflective layer may be formed from a material having a refractive index of less than 1.6. In some embodiments, the first anti-reflective layer may be formed from silicon dioxide, which has a refractive index of about 1.45. In some examples, the second anti-reflective layer may be tuned to reflect the same targeted wavelength as the first anti-reflective layer.

At 608, a third anti-reflective layer is formed over the second anti-reflective layer. For example, the third anti-reflective layer may include one or more of Aluminum Oxynitride ($AlO_xN_y$), Titanium Dioxide ($TiO_2$), Silicon Nitride ($Si_3N_4$), or Lanthanum Titanium Oxide ($La_2Ti_2O_7$). In some cases, the thickness of a third anti-reflective layer may be based in part on at least one targeted wavelengths which the third anti-reflective layer is tuned to cancel or reduce. In some embodiments, the third anti-reflective layer may have a refractive index that is the same as or substantially similar to the refractive index of the first anti-reflective layer.

At 610, a fourth anti-reflective layer is formed on the top surface of the third anti-reflective layer. In some embodiments, the fourth anti-reflective layer may have a refractive index that is same as or substantially similar to the refractive index of the second anti-reflective layer. For example, in a particular embodiment, the fourth anti-reflective layer may have a refractive index of less than 1.6. In some cases, the thickness of the fourth anti-reflective layer may be based in part on at least one targeted wavelengths which the fourth anti-reflective layer is tuned to cancel or reduce. In some examples, the fourth anti-reflective layer may be tuned to the same targeted wavelength as the third anti-reflective layer.

In some examples, an additional layer of material may be applied directly over the cover element between the first anti-reflective layer and the cover element, such that the refractive index of the material directly adjacent to the cover element may approximate a refractive index of glass. In some cases, the low refractive index material may be the same as the material selected for the second anti-reflective layer.

In some instances, the various anti-reflective layers may be laminated or adhered to the top surface of the cover element. In other instances, the anti-reflective materials may be applied using one or more deposition techniques, such as sputtering or electron beam deposition. For example, the anti-reflective materials may be applied via electron beam physical vapor deposition (EBPVD). EBPVD is a form of physical vapor performed in a vacuum in which a target (e.g., the anti-reflective material) is bombarded with an electron beam. The electron beam causes atoms from the anti-reflective material to transform into the gaseous phase. The atoms precipitate into solid form, thereby coating the desired surface.

At 612, an anti-fingerprint layer is formed over the fourth anti-reflective layer. In some cases, the anti-fingerprint coating may act as the top surface of the cover component exposed to the user and to protect the anti-reflective layers from scratching, chipping, or peeling. For instance, a material for the anti-fingerprint coating may be selected to ensure that it passes greater than 3,000 cycles on a steel wool abrasion test, as described in more detail below with respect to FIG. 7. In one particular example, each cycle of the steel wool test may include a motion over the top surface of the display stack from a first side to a second side and a second motion to return the steel wool back to the original positon. In some cases, the steel wool pad may have a size of about 4.0 and weight of about one kilogram at a rate of about 60 cycles per minute. In some cases, the steel wool pad may be replaced every 1,000 cycles. In other instances, the material for the anti-fingerprint coating may be selected to ensure greater than 4,000 or as high 5,000 cycles on a steel wool abrasion test. In some instance, the material selected for the anti-fingerprint layer may include one or more of Daikin UF 503, Daikin UF 504, Daikin UD 30x series, UD40x series, and UD50x series, Daikin-OPTOOL DXS, Canon Surfclear 100, or SHINESTUS.

In some implementations, the anti-fingerprint coating may be applied using one or more deposition techniques, such as sputtering or electron beam deposition. For example, the anti-reflective materials may be applied via EBPVD. In one particular implementations, the layers of the anti-reflective stack may be formed by sputtering, while the anti-fingerprint layer is formed by EBPVD.

Figure 7:
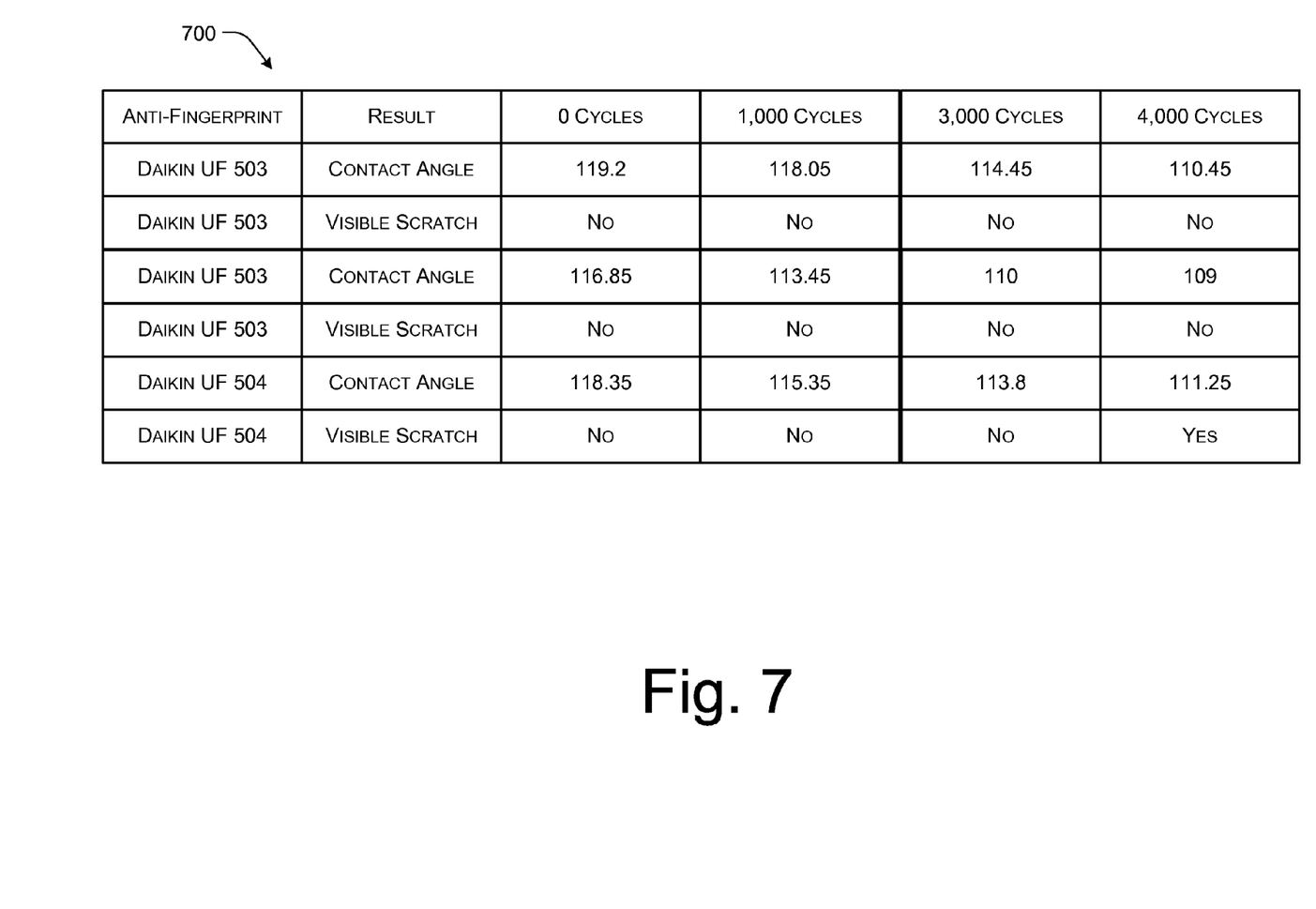
FIG. 7 illustrates a table showing partial results related to the steel wool abrasion test.

FIG. 7 illustrates a table 700 showing partial results related to one particular steel wool abrasion test. In the illustrated example, a display having a display element formed from glass, seven alternating anti-reflective layers formed from aluminum oxide nitride and silicon dioxide, and anti-fingerprinting layer formed from either Daikin UF 503 or Daikin UF 504 were tested. The tests included machine swiping a 1.0 inch by 1.0 inch 4.0 steel wool pad weighing approximately 1000 grams and about 1 mm to 1.2 mm thick at a rate of about 60 cycles per minute. In some instances, each cycle of the steel wool abrasion tests includes a two stroke process in which the first stroke is a 1.0 inch movement of the pad in a first direction over the top surface of the cover component and the second movement returns the pad to the original position. In some cases, the steel wool pad may be replaced approximately every 1,000 cycles.

In the table 700, the test results were measured by both contact angle of the natural light to the display following 0 cycles, 1,000 cycles, 3,000 cycles, and 4,000 cycles. As illustrated, when Daikin UF 503 was selected for the anti-fingerprint coating the contact angle after 0 cycles was 119.2 for the first test and 116.85 for the second tests. Likewise, after 1,000 cycles the contact angle was 118.05 for the first test and 113.45 for the second tests and after 4,000 cycles 110.45 for the first test and 109 for the second test. Also through the test, no visible scratches were detected after 4,000 cycles. Similarly, the steel wool abrasion test was administered using Daikin UF 504. In this test sample, at 0 cycles the contact angle was 118.35 for the natural light, 115.35 after 1,000 cycles, and 11.25 after 4,000 cycles. However, in this particular test after 4,000 cycles a visible scratch was detected on the display surface. Additionally, while the table 700 shows three test samples, it should be understood that many more test were preformed both with the Daikin UF 503 and 504 anti-fingerprint coating as well as other coating, such as Daikin-OPTOOL DXS, Daikin UD 30x series, UD40x series, and UD50x series, Canon Surfclear 100, or SHINESTUS. In some cases, it should be understood that the display stacks used in testing may also include different combination of materials for the anti-reflective layers and cover element located below the anti-fingerprint coating.

Figure 8:
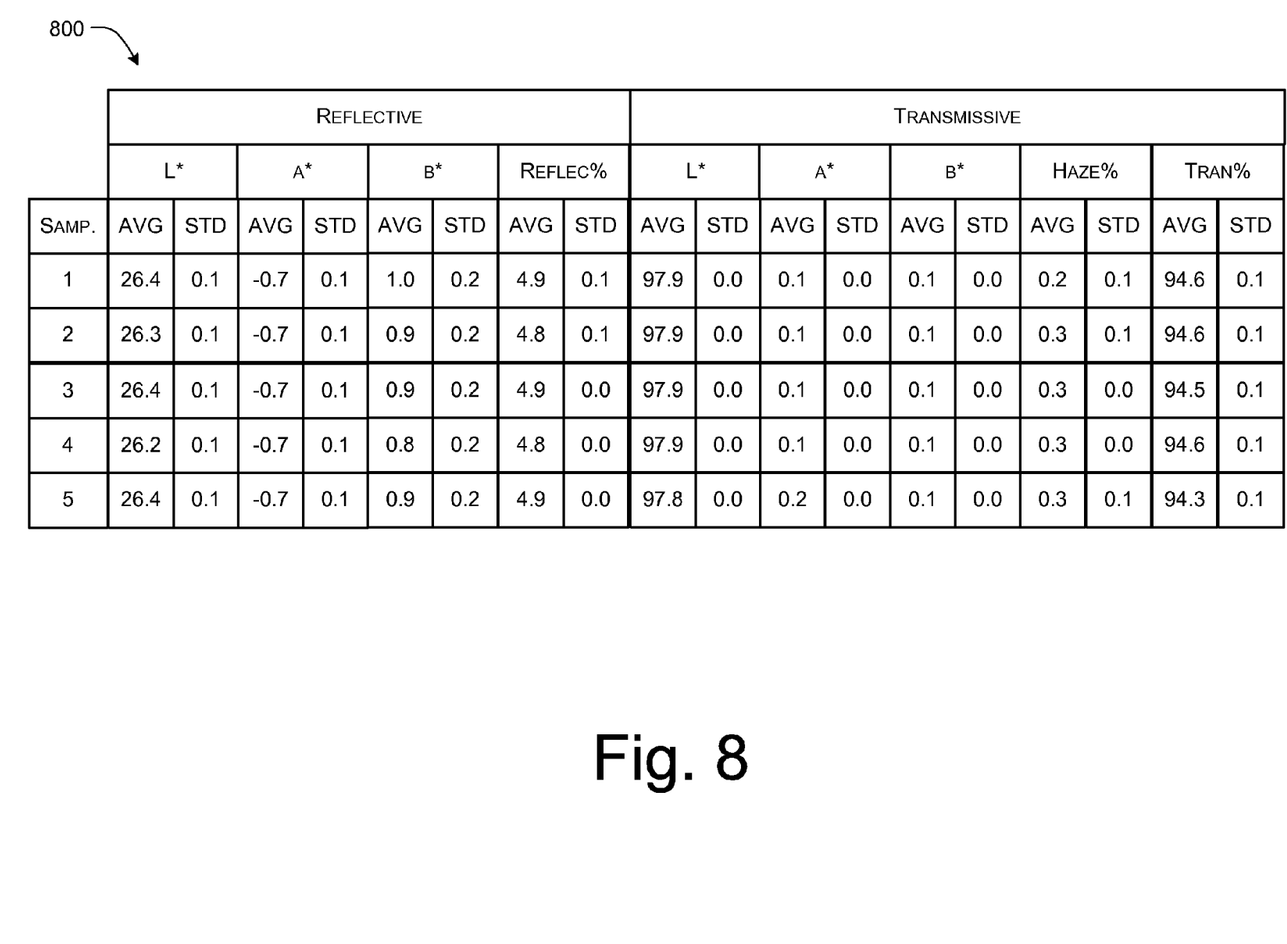
FIG. 8 illustrates a table showing partial results related to the reflective/transmissive tests.

FIG. 8 illustrates a table 800 showing partial results related to one particular reflective/transmissive tests. In the illustrated table 800, the test was performed on a display having an anti-reflective stack formed of seven alternating layers of aluminum oxide nitride and silicon dioxide on a glass substrate with either Diakin UF 503 or 504 as the anti-fingerprint layer. In general, the reflective/transmissive tests were performed by placing the display stack in a xenon-arc chamber. In some tests, the xenon-arc chamber was placed in a continuous light mode having an irradiance of about 0.35 plus or minus 0.02 W/(m2*nm) at 340 nm without water spray. In some cases, to pass the reflective/transmissive test, the anti-reflective stack has a total reflectance of less than 5% and a transmittance of greater than 93%.

As illustrated in table 800, the total percent of reflectance is between 4.8 and 4.9 percent for each test sample 1-5 and the total transmittance is between 94.3 and 94.6 percent. Thus, each of the combinations shown in the table 800 meet the requirements for designing a cover component for an electronic device described herein. Additionally, while the table 800 shows five test samples, it should be understood that many more test were preformed both with the various anti-fingerprint coatings such as, Daikin UF 503 and Diakin UF 504 as well as other coating, such as Daikin-OPTOOL DXS, Daikin UD 30x series, UD40x series, and UD50x series, Canon Surfclear 100, or SHINESTUS. In some cases, it should be understood that the display stacks used in testing may also include different combination of materials for the anti-reflective layers, such as AlON, $TiO_2$, $Si_xN_y$, $La_2Ti_xO_y$ alternating with layers of $SiO_2$ and cover element, such as glass, ceramic, sapphire, plastic or other polymers.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A display stack comprising:
    a cover component, the cover component including:
        a cover element having a top surface and a bottom surface;
        an anti-reflective stack disposed below the bottom surface of the cover element, the anti-reflective stack having a first layer comprising a first material having a first refractive index and a second layer below the first layer, the second layer comprising a second material having a second refractive index and wherein the second refractive index is greater than the first refractive index; and
        an anti-fingerprint coating disposed over the cover element; and
    an air gap disposed below the bottom surface of the cover component.

2. The display stack as recited in claim 1, wherein the anti-reflective stack further comprises:
    a third layer below the second layer, the third layer comprising the first material having the first refractive index; and
    a fourth layer below the third layer, the fourth layer comprising the second material having the second refractive index.

3. The display stack as recited in claim 2, wherein the anti-reflective stack further comprises a fifth layer below the fourth layer, the fifth layer comprising the first material having the first refractive index.

4. The display stack as recited in claim 2, wherein the anti-reflective stack further comprises a fifth layer below the fourth layer, the fifth layer comprising the second material having the second refractive index.

5. The display stack as recited in claim 1, wherein the anti-fingerprint coating is formed from a material having a contact angle of greater than 100 after 3,000 cycles of a steel wool test, wherein the contact angle is associated with natural light interacting with the cover component.

6. The display stack as recited in claim 1, wherein the first material is at least one of AlOzNw, $TiO_2$, $Si_xN_y$, $La_2Ti_iO_j$ and the second material is $SiO_2$ wherein z may be between 1 and 3, w may be between 1 and 3, x may be between 2 and 4, y may be between 3 and 4, i may be between 1 and 3, and j may be 6 and 8.

7. The display stack as recited in claim 1, wherein the cover component includes a touch sensing layer positioned below the third layer.

8. The display stack as recited in claim 1, wherein the anti-fingerprint coating is less than 30 nm thick, each layer of the anti-reflective stack is less than 40 nanometers thick and the anti-reflective stack is less than 400 nanometers thick.

9. The display stack as recited in claim 1, wherein the cover component includes a light guide positioned below the cover element.

10. The display stack as recited in claim 1, wherein the cover component has a transmittance rating of greater than 92 percent within visible wavelengths, a reflectance of less than 7.0 percent, and a haze of less than 1.0 percent.

11. The display stack as recited in claim 1, wherein the first refractive index is less than 1.6 and the second refractive index is greater than 1.6.

12. A method comprising:
    providing a cover element having a top surface and a bottom surface;
    forming a first anti-reflective layer disposed below the bottom surface of the cover element, the first anti-reflective layer comprising a first material having a first refractive index;
    forming a second anti-reflective layer disposed below the bottom surface of the first anti-reflective layer, the second anti-reflective layer comprising a second material having a second refractive index, the first refractive index different than the second refractive index; and
    forming an anti-fingerprint layer disposed over the top surface of the cover element.

13. The method as recited in claim 12, further comprising:
    forming a third anti-reflective layer disposed below the bottom surface of the second anti-reflective layer prior to forming the anti-fingerprint coating, the third anti-reflective layer comprising the first material having the first refractive index; and
    forming a fourth anti-reflective layer disposed below the bottom surface of the third anti-reflective layer prior to forming the anti-fingerprint coating, the fourth anti-reflective layer comprising the second material having the second refractive index.

14. The method as recited in claim 13, further comprising forming a fifth anti-reflective layer disposed below the bottom surface of the fourth anti-reflective layer prior to forming the anti-fingerprint coating, the fifth anti-reflective layer comprising the first material having the first refractive index.

15. The method as recited in claim 14, wherein the first refractive index is greater than the second refractive index.

16. The method as recited in claim 14, wherein the second refractive index is greater than the first refractive index.

17. The method as recited in claim 12, wherein the anti-fingerprint layer comprises a fluoro containing material.

18. The method as recited in claim 12, wherein the second refractive index is less than 1.6 and the first refractive index is greater than 1.6.

19. An electronic device comprising;
    a display stack to display content, the display stack including:

a cover component having a top surface and an opposing bottom surface;
an anti-reflective stack disposed below the bottom surface of the cover component, the anti-reflective stack including:
　a first layer comprising a material having a first refractive index;
　a second layer disposed below the first layer, the second layer having a second refractive index; and
　a bottom layer of the anti-reflective stack, the bottom layer having a refractive index introducing disruptive interference; and
an anti-fingerprint coating disposed over the anti-reflective stack;
an air gap positioned beneath the cover component; and
a display component positioned beneath the air gap, the display component being configured to display the content.

20. The electronic device as recited in claim 19, wherein:
the anti-reflective stack further comprises:
　a third layer disposed below the second layer, the third layer comprising aluminum oxide nitride and having the first refractive index; and
　a fourth layer disposed below the third layer, the fourth layer comprising silicon dioxide and having the second refractive index, wherein the second refractive index is greater than the first refractive index;
　a fifth layer below the fourth layer, the fifth layer comprising a material having a third refractive index, the third refractive index is less than the second refractive index;
the first layer comprises aluminum oxide nitride; and
the second layer comprises silicon dioxide.

* * * * *